UNITED STATES PATENT OFFICE.

MYRTIL KAHN AND ANTON OSSENBECK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

935,031.  Specification of Letters Patent.  Patented Sept. 28, 1909.

No Drawing.  Application filed July 8, 1909.  Serial No. 506,564.

*To all whom it may concern:*

Be it known that we, MYRTIL KAHN and ANTON OSSENBECK, doctors of philosophy, chemists, citizens of the German Empire, residing at Elberfeld, Germany, have invented new and useful Improvements in New Azo Dyes, of which the following is a specification.

Our invention relates to the manufacture and production of new coloring matters capable of dyeing either mordanted or unmordanted wool. The new dyestuffs are obtained by combining with 2-arylamino-5-naphthol-7-sulfonic acids the diazo compound prepared from dinitro-ortho-amino-meta-cresol (*Annalen der Chemie* 163 page 104).

The new dyestuffs are dark powders soluble in water with a violet color. They yield upon reduction with stannous chlorid and hydrochloric acid triamino-meta-cresol and 2-arylamino-5-naphthol-6-amino-7-sulfonic acids. They dye wool from an acid bath generally violet shades, which on chroming change to bright fast black shades.

In order to illustrate the new process more fully the following example is given, the parts being by weight: 21.3 parts of dinitro-ortho-amino-meta-cresol well mixed with 500 parts of water of 60° C. are dissolved by the addition of the neccessary quantity of ammonia and reprecipitated again from the cooled solution by the addition of 30 parts of hydrochloric acid of 19° Bé. The precipitate is then diazotized in the usual manner by means of hydrochloric acid and 7 parts of sodium nitrite. The diazo compound separates during the process of diazotation; it is added to an aqueous solution, which has to be stirred until the combination is finished, of 32 parts of 2-phenylamino-5-naphthol-7-sulfonic acid in an excess of sodium carbonate. The dyestuff is filtered off, pressed and dried. It is a dark powder soluble in water and in concentrated sulfuric acid with a reddish-violet color. By reduction with stannous chlorid and hydrochloric acid triamino-meta-cresol and 2-phenylamino-5-naphthol-6-amino-7-sulfonic acid are obtained. It dyes wool from acid baths violet shades which on being chromed are changed to a beautiful blue-black.

The process is carried out in an analogous manner on using other 2-arylamino-5-naphthol-7-sulfonic acids, such as 2-paratolyl-amino-5-naphthol-7-sulfonic acid or 2-ortho-anisyl-amino-5-naphthol-7-sulfonic acid etc.

We claim:—

1. The herein described new azo dyestuffs, obtainable from dinitro-ortho-amino-meta-cresol and 2-arylamino-5-naphthol-7-sulfonic acids, which dyestuffs are, after being dried and pulverized, dark powders soluble in water generally with a violet color; yielding upon reduction with stannous chlorid and hydrochloric acid triamino-meta-cresol and 2-arylamino-5-naphthol-6-amino-7-sulfonic acids; dyeing wool generally violet shades which on being chromed are changed to fast black shades, substantially as described.

2. The herein described new azo dyestuff obtainable from diazotized dinitro-ortho-amino-meta-cresol and 2-phenylamino-5-naphthol-7-sulfonic acid, which dyestuff is, after being dried and pulverized, a dark powder soluble in water with a reddish-violet color and soluble in concentrated sulfuric acid with a reddish-violet color; yielding upon reduction with stannous chlorid and hydrochloric acid triamino-meta-cresol and 2-phenylamino-5-naphthol-6-amino-7-sulfonic acid; and dyeing wool violet shades which on being chromed are changed to black shades, substantially as described.

In testimony whereof we have hereunto set our hands in the presence of two subscribing witnesses.

MYRTIL KAHN. [L. S.]
ANTON OSSENBECK. [L. S.]

Witnesses:
OTTO KÖNIG,
WILLY KLEIN.